Figure 1:
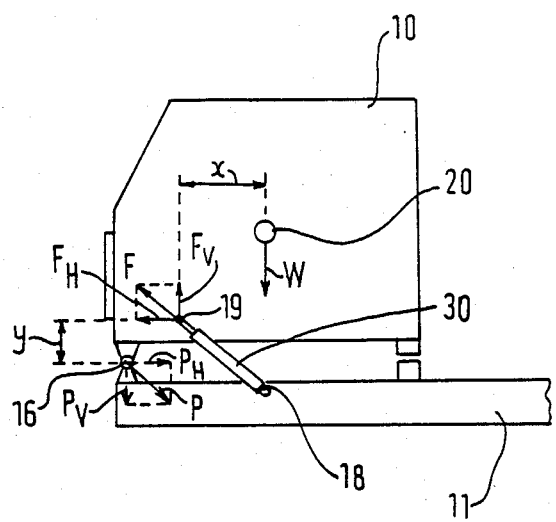

United States Patent [19]

Marjoram

[11] Patent Number: 4,488,613
[45] Date of Patent: Dec. 18, 1984

[54] FLUID SUSPENSIONS

[75] Inventor: Robert H. Marjoram, Wyken, England

[73] Assignee: Dunlop Limited, London, England

[21] Appl. No.: 436,933

[22] Filed: Oct. 27, 1982

[30] Foreign Application Priority Data

Nov. 10, 1981 [GB] United Kingdom ............... 8133899

[51] Int. Cl.³ ............................................. B62D 23/00
[52] U.S. Cl. ................................. 180/89.15; 296/190
[58] Field of Search ............... 180/89.13, 89.14, 89.15, 180/89.16; 296/190, 35.1

[56] References Cited

U.S. PATENT DOCUMENTS 3,797,882  3/1974  Brimmall ..................... 180/89.15
4,372,411  2/1983  Flower ........................ 180/89.15

Primary Examiner—Joseph F. Peters, Jr.
Assistant Examiner—Kenneth R. Rice
Attorney, Agent, or Firm—Stevens, Davis, Miller & Mosher

[57] ABSTRACT

The invention relates primarily to fluid suspension systems for truck cabs which are required to tilt on the chassis in order to gain access to the engine. In order to provide cab tilt pivots the displacer units comprise pins which engage in recesses when the units are retracted and tilting means is arranged in relation to the cab and the chassis such that the pins are not displaced from the recesses when the tilting means is operated.

11 Claims, 6 Drawing Figures

FLUID SUSPENSIONS

This invention relates to fluid suspensions and more particularly to improvements in the use of a fluid suspension to support a body part of a vehicle which is adapted to be tiltable about a horizontal axis. An example of such a tiltable body part is the driver's cab, of a cargo-carrying vehicle such as a truck, which is capable of being tilted about a forward, transverse horizontal axis to gain access to the engine or other components located under the cab. Such a vehicle will be referred to as a "cab over engine" vehicle.

Driver comfort is of increasing importance and it is known to mount the driver's cab on the chassis of a truck by a suspension system separate from and softer, or of lower frequency, than that of the main chassis suspension system. A suspension system which is well proven for optimizing passenger comfort without the drawbacks associated with simple mechanical springs is a fluid suspension system. As used herein and in the appended claims what is meant by a "fluid suspension system" is one in which one part of a vehicle is supported on another by means of a distribution of individual displacer units each comprising mutually telescopic elements respectively connected to the supporting and the supported vehicle parts, each displacer unit containing a fluid which transmits loads applied between the suspending and suspended vehicle parts to a spring. In a hydropneumatic suspension system the fluid in each displacer unit is a liquid which transmits loads applied to the displacer unit to a gas spring. Each displacer unit may comprise its own gas spring or two or more displacer units may communicate via pipelines with a common gas spring. Alternatively the spring on which the fluid in each displacer unit acts may be a body of elastomeric material. Fluid flow within the system, is preferably restricted, normally by a restriction within each displacer unit, to damp telescopic movement between the elements of each displacer unit.

Each displacer unit of a fluid suspension system normally takes the form of a stem reciprocable into and out of a housing and a seal for the fluid takes the form of a diaphragm sealed at its outer periphery within the housing and at its inner periphery to a piston attached to the stem. The diaphragm may be of the "rolling lobe" type which accommodates reciprocative movement of the stem by changing its shape.

If a fluid suspension system is used for its optimum "ride" characteristics to support the tiltable cab of a lorry on the lorry chassis the forward displacer units will necessarily be subjected to varying loads as the cab pivots about a horizontal axis in the region of the forward displacer units and the centre of gravity of the cab moves relative thereto in the fore and aft directions. It has been proposed to lift the cab of a "cab over engine" vehicle by a hydraulic ram pivoted to and acting between the chassis and the cab in a forward and upward direction. The effect of this arrangement is that the forward displacer units are subjected, during tilt of the cab, to a reaction force which varies in its direction of application as the centre of gravity of the cab and the pivotal connection between the ram means and the cab moves in relation to them. At the commencement of tilt the forward displacer units are subject to a forward and upward load from the ram but as the point of pivotal connection between the cab and the ram and the centre of gravity of the cab move forward in relation to the forward displacer units the load to which they are subjected is converted first into a downward and then into a rearward load. During tilt of the cab each forward displacer unit is therefore subjected to a load reversal in both the horizontal and the vertical direction. In the absence of any constraints this load variation applied to the displacer units will cause telescopic movement of its elements. The application of lateral forces to a displacer unit is undesirable as causing wear and abrasion particularly to the diaphragm. This is accentuated if loads are applied to the displacer unit in a sequence such that when subject to lateral forces it is also fully extended creating a considerable bending moment between the stem and the housing.

Apart from potential damage to the displacer units such behaviour is also undesirable in producing erratic and unpredictable minor displacements of the cab, during tilt, both in the horizontal and vertical directions. Translation of the cab in the horizontal direction can be controlled at each forward displacer unit by a location link pivoted to the cab and to the chassis which constrains the cab to move in the vertical plane in a circle centered on the pivotal connection between the link and the chassis. The use of such location links will mitigate the effects of load reversal applied to the displacer units in the horizontal direction but will not control load reversal applied to the displacer units in the vertical direction (i.e. the axial direction of each displacer unit in which its elements are telescopic). Thus even if such location links are used the tilting cab will still be unstable in its movement because axial load reversal may not occur simultaneously to transversely-spaced displacer units. For example if the truck has even a slight list, as may be caused by the camber of a road, the lower of two forward displacer units supporting it during tilt will be subject to axial load reversal before the other causing the cab to tilt laterally as it tilts forward or backward.

One solution to the above problems would be to provide means for locking the telescopic elements of each displacer unit against relative movement prior to tilting the cab so that the axis about which the cab pivots relative to the chassis is fixed.

A principal object of the present invention is to provide an arrangement such that in the absence of any means for locking the elements of the displacer units against telescopic movement the aforementioned problems of damage to the displacer units and unstable movement of the tilting cab are obviated.

In accordance with the present invention there is provided a vehicle having a chassis or other first part supported by wheels or other ground engaging means of the vehicle and a second, body part which is tiltable relative to the first part about a horizontal axis, there being interposed between said parts a fluid suspension system which includes two or more laterally spaced displacer units in the region of said axis each of which in a normal or "ride" condition of said second part transmit vertical loads between said parts to a spring by reciprocative movement between elements of each displacer unit connected respectively to said first and said second part, characterized by the combination of features such that:

(a) one element of each said unit has a bearing member and there is associated with the other element of said unit a vertically opening recess arranged to receive the bearing member in a limit stop position wherein said unit ceases to be responsive to the spring, the recesses serving to retain the bearing members when said second part is subsequently tilted, and (b) means for tilting the second part is arranged such that at no time during the tilting movement of the second part does it exert a force capable of displacing the bearing members out of the recesses.

In a preferred construction the bearing members are laterally extending pins which are received in the recesses when the displacer units are telescopically retracted under the weight of the cab by relieving fluid pressure in each displacer unit. By use of suitable control valve means such pressure relief may be effected automatically in response to action preparatory to cab tilt such as release of latches which lock the rear of the cab to the chassis during normal, "ride" conditions or the application of pressure to a hydraulic ram arranged to tilt the cab.

In a preferred construction applied to a truck of the "cab over engine" type two forward displacer units serving as the fluid suspension of the cab each comprise a housing fixed to the chassis, a stem reciprocable into and out of the upper end of the housing and pivotally connected to the cab, a pivot pin coaxial with the pivotal connection between the stem and cab and extending laterally of the stem and a yoke integral with the housing which presents an upwardly opening recess which will receive the ends of the pin when the stem is retracted into the housing. The recess is preferably of a rounded configuration and the pin is preferably cylindrical such that the pin can roll within the recess to accommodate changing reaction forces applied to the pin as the cab is tilted.

To counter any minor upward component of the reaction force which may be applied to the pin during the initial movement of the cab toward its tilted position the forward side of the recess may be slightly overshot i.e. its curvature may continue slightly beyond the vertical plane to provide an overhanging abutment face which will help to restrain movement of the pin out of the recess.

If hydraulic ram means is used to tilt the said second part or cab it is so disposed that in the normal or "ride" position of the cab it forms with the horizontal plane an angle such that at no time during the tilting movement of the cab are the pins, resting in the recesses, subject to a substantial upward net reaction load. Evidently the ram means will exert a maximum vertically upward force component at the pins, when movement of the cab from its normal, "ride" condition is initiated by the ram when the centre of gravity of the cab is at its furthest distance rearwardly from the pins in the horizontal direction and when the pivotal connection between the ram and cab is closer to the pins. The overshot configuration of the forward sides of the recesses is designed to prevent displacement of the pins out of the recesses when subject to any minor vertical component which may arise at this initial stage of tilting the cab.

Figure 2:
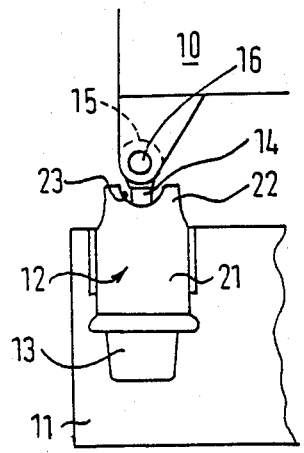
Figure 3:
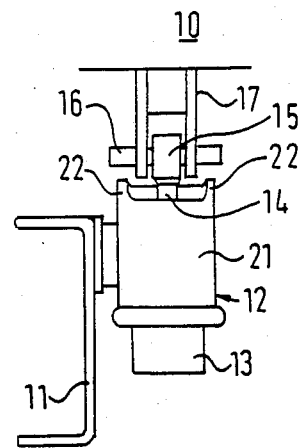
Figure 4:
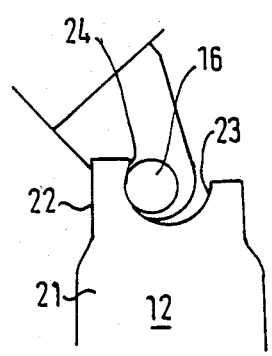
Figure 5:
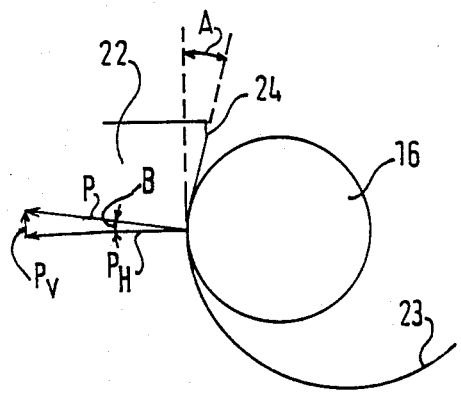
Figure 6:
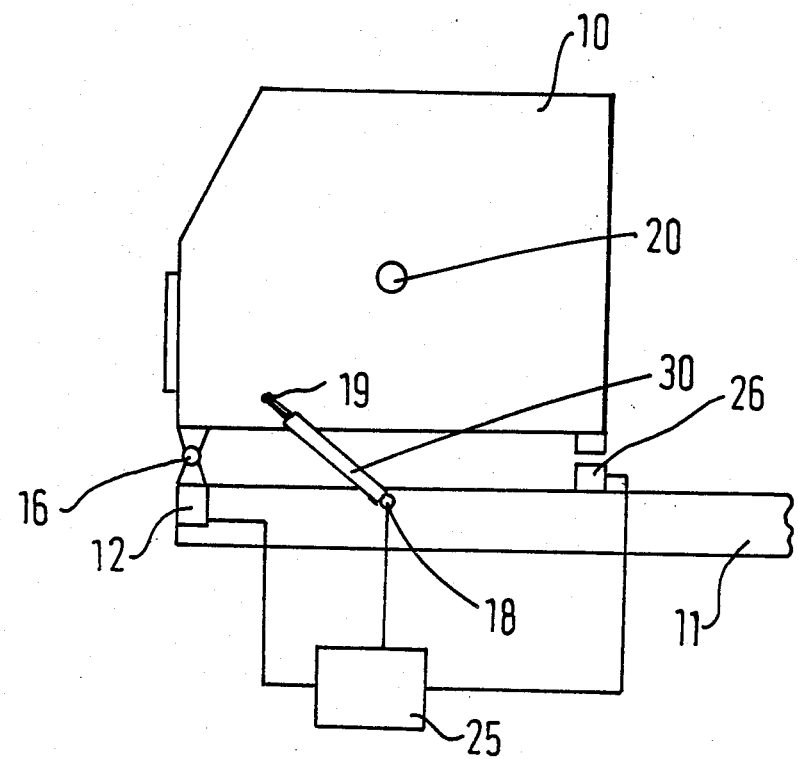

A preferred embodiment of the present invention will now be described with reference to the accompanying diagrammatic drawings, in which:

FIG. 1 is a schematic side elevation of the driver's cab and chassis of a vehicle of the "cab over engine" type, FIGS. 2 and 3 are respectively a side view and a front view on an enlarged scale of one of the two displacer units constituting the tilt pivots of the cab of FIG. 1, FIG. 4 is a side view of part of a modified displacer unit shown in an attitude which it adopts during tilt of the cab, FIG. 5 is a diagrammatic view on an enlarged scale of the recess and pin of the assembly of FIG. 4, and FIG. 6 is a schematic view similar to FIG. 1, showing hydraulic connections.

FIG. 1 illustrates the driver's cab 10 of a truck of the "cab over engine" type which is supported relative to the lorry chassis 11 by a cab suspension separate from the main suspension (not shown) whereby the chassis 11 is supported by the wheels of the vehicle. The suspension of the cab 10 is of the hydropneumatic type comprising four displacer units one of which is generally indicated at 12 in FIGS. 2 and 3. As is known per se each displacer unit 12 comprises an upwardly opening housing 13 secured to the chassis 11 and a stem 14 reciprocable into and out of the open end of the housing 13 and connected as at 15 to the cab 10. Within the housing 13 a rolling lobe diaphragm (not shown) surrounds the stem 14 and spans the gap between the stem and the inner periphery of the housing 13 to form a fluid seal between the housing and stem at all positions of telescopic extension of the stem out of the housing 13. Liquid within the housing 13 under the diaphragm is pressurized by the weight of the cab 10 to press the stem 14 downwardly into the housing 13 and this pressure is transmitted to a gas spring (not shown) which resiliently absorbs the load and tends to return the stem 14 to its initial position of extension out of the housing 13.

The displacer unit 12 can take a variety of forms which will not be discussed in details because they are well known in the art. For example individual gas springs (not shown) may be incorporated in the individual displacer housings 13 or two or more displacers 12 may have a common gas spring at a remote location, being connected thereto by pipe lines for the liquid.

In accordance with the present invention the connection 15 between the stem 14 of each of two transversely spaced forward displacer units 12 is a pivotal connection, a pin 16 integral with the stem 14 extending laterally therefrom through aligned apertures in pairs of lugs 17 extending downwardly from the forward end of the cab 10. The coaxial pins 16 of the forward displacer units 12 provide pivots about which the cab 10 is rotatable from the normal "ride" position in which it is shown in FIG. 1 to a raised and forwardly tilted position permitting access to the engine or other components of the vehicle (not shown) disposed between the chassis members beneath the cab. Suspension means to support the rear of the cab when in its "ride" position shown in FIG. 1 are not illustrated but it will be understood that if desired these may take the form of rear displacer units similar to the forward displacer units but not pivotally connected to the cab 10. Whatever means is provided to support the rear of the cab will be relieved of the weight of the cab as soon as cab tilt is commenced. Therefore the problems previously discussed of varying load application as the cab is tilted do not apply to suspension means for the rear of the cab and such cab rear suspension means forms no part of the present invention.

As is also diagrammatically shown in FIG. 1 the cylinder of a hydraulic ram 30 is pivotally connected to the chassis 11 at 18 and its piston is pivotally connected to the cab 10 at 19. The centre of gravity of the cab 10 is indicated at 20.

In accordance with the present invention an outer casing 21 is swaged onto or otherwise secured to the exterior of the housing 13 of each displacer unit to be upstanding therefrom and opposite sides of each casing 21 have shoulders 22 which are formed with similar, upwardly opening rounded recesses 23 such that the shoulders 22 form a yoke on which the associated pin 16 may rest with its opposite ends in the recesses 23 when the stem 14 is sufficiently retracted into the housing 13. Except if it "bottoms out" under exceptional shock loads the pin 16 of each displacer unit will not touch the associated yoke when the cab 10 is in its normal "ride" position due to the maintenance of fluid pressure in each forward displacer unit 12 tending to keep the stem 14 telescopically extended out of the housing 13 as exemplified in FIGS. 2 and 3.

As a preliminary to tilting the cab 10 the two forward displacer units 12 are depressurized, allowing their stems 14 to sink into the housings 13 under the weight of the cab. Such depressurization of the displacers 12 can be achieved in a number of ways which will be apparent to one skilled in the art. Either the associated gas spring can be relieved of pressure or liquid can be temporarily bled from the displacers through suitable control valve means. Preferably depressurization of the forward displacer units 12 is automatic and responsive to the release, under the control of valve means 25 of the latches 26 which releasably secure the rear of the cab 10 to the chassis 11 during normal "ride" conditions. Alternatively depressurization of the forward displacer units 12 may be made responsive to the application of pressurized fluid to the tilt ram under the control of valve means 25.

As can be seen most clearly in FIGS. 4 and 5, when a displacer unit 12 is depressurized and the associated pin 16 is resting in the yoke provided by the shoulders 22 of the associated casing 21 each pin is restrained against movement in all directions except vertically upward. Due to the rounded configuration of the recesses 23 and the cylindrical shape of the pins 16 the ends of the pins 16 are able to roll in their recesses 23 under the varying reaction forces which occur as the cab 10 is tilted about the pins 16 by the hydraulic ram.

It will be apparent that for the arrangement illustrated in FIGS. 2 and 3 to maintain the cab 10 in a stable condition during tilt (i.e. so that it rotates about the common axis of the aligned pins 16 while this axis is maintained generally stationary in space) the displacer units must not be subject at any time during the tilting movement of the cab to a force tending to lift the pins 16 out of the yokes. Ways in which this can be achieved using a hydraulic ram as illustrated in FIG. 1 will now be discussed.

In FIG. 1:

W is the weight of the cab;
F is the force imposed on the cab by the ram 30;
$F_V$, $F_H$ are the vertical and horizontal components, respectively of force F;
P is the reaction acting on the cab through the pivot 16;
$P_V$, $P_H$ are the vertical and horizontal components of force P;
x is the horizontal distance between the centre of gravity of the cab and the pivotal connection 19 of the ram to the cab;
y is the vertical distance between the pivotal axis of the pivot 16 and the pivotal connection 19.

The directions of the forces P and F change during the tilting operation, but at the commencement of this operation the components $P_V$ and $F_V$ will both be upward (although P is shown downwardly in FIG. 1 for ease of illustration). In this condition the vertically resolved components are related by the equation $$P_V + F_V = W$$

Resolving horizontally, $$F_H = P_H$$

In order for the ram 30 to tilt the cab about the pivot 16 the moment of the force F about the pivot 16 must be equal to or greater than the moment of the cab weight W about the pivot 16. In accordance with the invention, however, a further criterion should be met: if the relationship between the forces F and P is suitably controlled it is possible to ensure that the upward reaction $P_V$ of the pivot on the cab is never reduced to zero.

If $P_V = 0$, taking moments about the connection 19, for equilibrium $$P_H \cdot y = W \cdot x$$

or, since $P_H = F_H$ $$F_H \cdot y = W \cdot x$$

Since the effect of the moment of $P_V$ about the pivot 19, if $P_V$ is upward, is in the same direction as that of W, the above criterion will always be satisfied if $$F_H \cdot y > W \cdot x$$

As "W" and "y" are generally fixed for a particular cab, this is achieved, in accordance with the invention, by either increasing $F_H$ (reducing the cylinder's initial angle to the horizontal), or decreasing x (moving the cylinder rearwards), or a combination of the two.

These criteria will ensure that the vertical component of the pivot reaction force never produces tensile loads in the displacer units 12, i.e. there is no load reversal along their vertical axes.

In case design considerations make it undesirable fully to comply with the above criteria a small vertical component acting upwardly on the pivot pin 16 during the initial tilt movement of the cab 10 may be tolerated by a modification of the shape of the leading side of each recess 23 as indicated at 24 in FIGS. 4 and 5. According to the modification of FIGS. 4 and 5 the leading side of each recess 23 is, while still of rounded configuration, overshot from the perpendicular by the angle A. As shown in FIG. 5 the angle A should be greater than the angle B between the reaction force P exerted by the pin 16 and the horizontal when the angle B is at a maximum. In practice this will be when tilt of the cab 10 is initiated and the tilt ram is at a maximum angle to the horizontal or the distance x between the pivot point 19 and the centre of gravity 20 is at a maximum while the point 19 is between the pins 16 and the centre of gravity 20.

To ensure that there is no interference between the yokes and the associated pins 16 during normal, "ride" conditions the angle A will normally be no greater than 15° to 20°.

Having now described my invention, what I claim is:

1. A vehicle having a chassis or other first part supported by wheels or other ground engaging means of the vehicle and a second, body part which is tiltable relative to the first part about a horizontal axis, there being interposed between said parts a fluid suspension system which includes displacer units in the region of said axis which in a normal or "ride" condition of said second part transmit vertical loads between said parts to a spring by reciprocative movement between elements of each displacer unit connected respectively to said first and second part, characterized by the combination of features such that:

(a) one element of each said unit has a laterally extending pin and there is associated with the other element of said unit a vertically open ended recess arranged to receive the pin in a limit stop position wherein when said one element is retracted into the other element so that said unit ceases to be responsive to the spring, the recesses serve as bearings for the pins when said second part is subsequently tilted, and (b) means for tilting the second part, said tilting means being positioned to exert a force on the second part so that at no time during the tilting movement of the second part does it exert a force capable of displacing the pins out of the recesses.

2. A vehicle as claimed in claim 1, wherein said body part is a cab and the arrangement is such that the pins are received in the recesses when the displacer units are telescopically retracted under the weight of the cab by relieving fluid pressure in each displacer unit.

3. A vehicle as claimed in claim 2, wherein valve means responsive to the release of latches which lock the rear of the cab to the chassis during normal, "ride" conditions is provided to relieve fluid pressure in each said displacer unit.

4. A vehicle as claimed in claim 2, wherein valve means responsive to the application of pressure to a hydraulic ram arranged to tilt the cab is provided to relieve fluid pressure in each said displacer unit.

5. A vehicle as claimed in claim 1, wherein hydraulic ram means is used to tilt the said second part or cab, the ram being so disposed that in the normal or "ride" position of the cab it forms with the horizontal plane an acute angle such that at no time during the tilting movement of the cab are the pins, resting in the recesses, subject to a substantial upward net reaction load.

6. A truck of the "cab over engine" type having a chassis or other first part supported by wheels or other ground engaging means of the vehicle and a second, body part constituting a cab which is tiltable relative to the first part about a horizontal axis, being interposed between said parts a fluid suspension system which includes two forward displacer units in the region of said axis each having a housing fixed to one of said parts and a stem reciprocable into and out of one end of the housing and pivotally connected to the other part, which displacer units in a normal or "ride" condition of said cab are arranged to permit reciprocative movement between the housing and the stem, characterized by the combination of features such that:

(a) the stem of each said unit has a laterally extending pin coaxial with the pivotal connection between the stem and the other part and there is associated with the housing of said unit a yoke having a vertically opening recess arranged to receive the pin in a limit stop position when the stem is retracted into the housing, the recesses serving as bearings for the pins when said cab is subsequently tilted, and (b) means for tilting the cab, said tilting means being positioned to exert a force on the cab so that at no time during the tilting movement of the cab does it exert a force capable of displacing the pins out of the recesses.

7. A vehicle as claimed in claim 6, wherein the recess is of a rounded configuration and the pin is cylindrical such that the pin can roll within the recess to accommodate changing reaction forces applied to the pin as the cab is tilted.

8. A vehicle as claimed in claim 7, wherein the forward side of the recess is slightly overshot.

9. A vehicle as claimed in claim 8, wherein the overshot is a curvature of the forward side of the recess continuing beyond the vertical plane.

10. A vehicle as claimed in claim 6, wherein the yoke provides a pair of recesses, one for each end of the pivot pin.

11. A truck of the "cab over engine" type having a chassis or other first part supported by wheels or other ground engaging means of the vehicle and a second, body part which is tiltable relative to the first part about a horizontal axis, there being interposed between said parts a fluid suspension system which includes two forward displacer units in the region of said axis serving as the fluid suspension for the cab, each displacer unit comprising a housing fixed to the chassis, a stem reciprocable into and out of the upper end of the housing and pivotally connected to the cab, which in a normal or "ride" condition of said second part transmit vertical loads between said parts to a spring by reciprocative movement between elements of each displacer unit connected respectively to said first and said second part, characterized by the combination of features such that:

(a) the stem of each said unit has a laterally extending pin coaxial with the pivotal connection between the stem and the cab; the housing having an integral yoke presenting an upwardly opening recess arranged to receive the pin when the stem is retracted into the housing in a limit stop position wherein said unit ceases to be responsive to the spring, the recesses being positioned to serve as bearings for the pins when said cab is subsequently tilted, and (b) means for tilting the cab arranged such that at no time during the tilting movement of the cab does it exert a force capable of displacing the pins out of the recesses.

* * * * *